US 9,445,196 B2

United States Patent
Gaensler et al.

(10) Patent No.: US 9,445,196 B2
(45) Date of Patent: Sep. 13, 2016

(54) INTER-CHANNEL COHERENCE REDUCTION FOR STEREOPHONIC AND MULTICHANNEL ACOUSTIC ECHO CANCELLATION

(71) Applicant: MH Acoustics, LLC, Summit, NJ (US)

(72) Inventors: Tomas F. Gaensler, Warren, NJ (US); Eric J. Diethorn, Long Valley, NJ (US)

(73) Assignee: MH Acoustics LLC, Summit, NJ (US)

( * ) Notice: Subject to any disclaimer, the term of this patent is extended or adjusted under 35 U.S.C. 154(b) by 216 days.

(21) Appl. No.: 14/334,915

(22) Filed: Jul. 18, 2014

(65) Prior Publication Data

US 2015/0030172 A1 Jan. 29, 2015

Related U.S. Application Data

(60) Provisional application No. 61/857,840, filed on Jul. 24, 2013.

(51) Int. Cl.
| | |
|---|---|
| *H04R 3/02* | (2006.01) |
| *H04R 3/00* | (2006.01) |
| *H04R 3/12* | (2006.01) |
| *H04M 9/08* | (2006.01) |

(52) U.S. Cl.
CPC ............ *H04R 3/02* (2013.01); *H04M 9/082* (2013.01); *H04R 3/005* (2013.01); *H04R 3/12* (2013.01)

(58) Field of Classification Search
CPC .............. H04M 9/082; G10L 19/008; G10L 2021/02082; H04R 3/02; H04R 3/12; H04R 3/005

USPC ................................. 381/66, 93, 97, 94.1; 379/406.01–406.16; 370/286
See application file for complete search history.

(56) References Cited

U.S. PATENT DOCUMENTS

| | | | | |
|---|---|---|---|---|
| 6,895,093 | B1 * | 5/2005 | Ali | H04B 3/23 379/406.01 |
| 7,403,609 | B2 * | 7/2008 | Hirai | H04R 3/02 370/286 |

(Continued)

OTHER PUBLICATIONS

Sondhi, M. M., et al., "Stereophonic Acoustic Echo Cancellation— An Overview of the Fundamental Problem," IEEE Signal Processing Letters, vol. 2, No. 8, Aug. 1995, pp. 148-151.

(Continued)

*Primary Examiner* — David Ton
(74) *Attorney, Agent, or Firm* — Mendelsohn Dunleavy, P.C.; Steve Mendelsohn

(57) ABSTRACT

In an audio system having acoustic echo, incoming audio signals are decorrelated by applying both phase modulation and amplitude modulation. The resulting decorrelated signals are rendered by loudspeakers, and co-located microphones generate outgoing audio signals that include echo signals caused by the existence of acoustic echo paths from the loudspeakers to the microphones. Acoustic echo cancellation (AEC) is applied to the outgoing audio signals to reduce the amount of echo in those signals. Decorrelating the incoming audios signals using amplitude modulation in addition to phase modulation can increase the effectiveness of the AEC processing. In a frequency-domain implementation, the amount of amplitude modulation can be different for different frequency bands (e.g., greater amplitude modulation for lower frequencies corresponding to human speech and/or no amplitude modulation for higher frequencies).

19 Claims, 3 Drawing Sheets

(56) References Cited

U.S. PATENT DOCUMENTS 9,269,343 B2* 2/2016 Munk ............... H04R 3/02
2009/0304198 A1* 12/2009 Herre ............... G10L 19/008
                                                                                 381/66

OTHER PUBLICATIONS

Benesty, J., et al., "A Better Understanding and an Improved Solution to the Specific Problems of Stereophonic Acoustic Echo Cancellation," IEEE Trans. on Speech and Audio Proc., vol. 6, No. 2, Mar. 1998, pp. 156-165.

Ali, M., "Stereophonic Acoustic Echo Cancellation System Using Time-Varying All-Pass Filtering for Signal Decorrelation," in Proc. IEEE ICASSP, 1998, pp. 3689-3692.

Joncour, Y., et al., "A Stereo Echo Canceler with Pre-Processing for Correct Echo-Path Identification," in Proc. IEEE ICASSP, 1998, 4 pages.

Herre, J., et al., "Acoustic Echo Cancellation for Surround Sound Using Perceptually Motivated Convergence Enhancement," in Proc. IEEE ICASSP, 2007, pp. I-17 through I-20.

Wada, T. S., et al., "Effective Channel Decorrelation Via Resampling for Multi-Channel Acoustic Echo Cancellation Based on Residual Echo Enhancement," in Proc. IWAENC, 2010, 4 pages.

Sondhi, M. M., et al., "Acoustic Echo Cancellation for Stereophonic Teleconferencing," in Proc. WASPAA, New Paltz, May 1991, 2 pages.

Gaensler, T., et al., "New Insights Into the Stereophonic Acoustic Echo Cancellation Problem and an Adaptive Nonlinearity Solution," IEEE Trans. on Speech and Audio Proc., vol. 10, No. 5, Jul. 2002, pp. 257-267.

Wada, T. S., et al., "Multi-Channel Acoustic Echo Cancellation Based on Residual Echo Enhancement with Effective Channel Decorrelation via Resampling," in Proc. IWAENC, 2010, 4 pages.

Faller, C., et al. "Two Stage Estimation for the Echo Paths in Stereophonic Acoustic Echo Cancellation." IWAENC. No. EPFL-CONF-167557. 2006, pp. 1-4.

* cited by examiner

100

150

INTER-CHANNEL COHERENCE REDUCTION FOR STEREOPHONIC AND MULTICHANNEL ACOUSTIC ECHO CANCELLATION

CROSS-REFERENCE TO RELATED APPLICATIONS

This application claims the benefit of the filing date of U.S. provisional application No. 61/857,840, filed on Jul. 24, 2013, the teachings of which are incorporated herein by reference in their entirety.

BACKGROUND

1. Field of the Invention

The present invention relates to audio signal processing and, more specifically but not exclusively, to stereophonic acoustic echo cancellation (AEC).

2. Description of the Related Art

This section introduces aspects that may help facilitate a better understanding of the invention. Accordingly, the statements of this section are to be read in this light and are not to be understood as admissions about what is prior art or what is not prior art.

In a two-way audio communication, undesirable acoustic echo can occur when sounds (i.e., acoustic signals) corresponding to (electronic) audio signals transmitted from a first side of the two-way communication and rendered by loudspeakers at the second side are picked up by microphones at the second side and included in the audio signals transmitted back to and rendered by loudspeakers at the first side as acoustic echo to individuals located at the first side. Acoustic echo cancellation (AEC) refers to signal processing that attempts to estimate the audio signals corresponding to acoustic echo occurring at the second side of the two-way audio communication and appropriately compensate the audio signals to be transmitted back to the first side to reduce or even eliminate the contribution of that acoustic echo in those transmitted audio signals.

Note that, as used in this disclosure, the term "loudspeaker" refers to any suitable transducer for converting electronic audio signals into acoustic signals (including headphones), while the term "microphone" refers to any suitable transducer for converting acoustic signals into electronic audio signals.

In a monophonic audio system, each side has only one microphone and only one loudspeaker. In a stereophonic audio system, each side has two microphones that generate left and right outgoing audio channels and two loudspeakers that render left and right incoming audio signals. In a multichannel audio system, each side has more than two microphones and more than two loudspeakers. Acoustic echo cancellation can be applied with varying sophistication and corresponding variable success in each of these different audio architectures.

Both the stereophonic AEC (SAEC) and multichannel AEC (MAEC) problems differ from the straightforward monophonic AEC application because of the non-uniqueness problem, i.e., the underlying equations to be solved by the echo canceller system can be singular or ill conditioned. The major effect this has is that, if no precaution is taken, the AEC has to re-converge as soon as there is any acoustic change in the transmission room (aka the far-end room or the first side of a two-way audio communication referred to previously). In the monophonic AEC case, it is not necessary to reconverge following transmission-room changes since the solution is independent of this variation. Still, as in the monophonic AEC case, SAEC and MAEC modules have to manage normal echo-path changes at the receiving room (aka the near-end room or the second side).

The seriousness of transmission-room tracking is that these changes can be very abrupt, e.g., one talker in the far-end room stops talking when another person in the same room starts talking. Considering all practical issues there are to control monophonic AECs, neglecting this additional fundamental problem can cause significant performance issues for any stereo or multichannel AEC implementation. The net effect of acoustic-path changes in both the transmission room and the receiving room can be seen in terms of the inter-channel cross-correlation of the receive channels. The acoustic paths in the transmission room also determine the inter-channel cross-correlation of the downlink (far-end) channels.

It is desirable to control and limit the inter-channel cross-correlation of transmission channels (downlink), without causing objectionable stereo image distortion or spectral artifacts.

In the literature, there are various proposals for achieving inter-channel decorrelation. For details, see Refs [1], [2], [3], [4], [5], [6], and [7]. In fact, the methods presented in the latter four references belong to the same category, i.e., they all introduce a time-varying phase shift in the stereo channels to achieve decorrelation. This approach is very effective, especially for higher frequencies (>1.5 kHz), while it has to be carefully applied at lower frequencies to avoid noticeable distortion. Frequencies less than 1 kHz are more difficult than higher frequencies to decorrelate without introducing audible distortion, because human hearing is more sensitive to phase shifts at the lower frequencies (Ref [8]).

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

This disclosure describes a novel principle and implementation of an inter-channel amplitude coherence reduction (CR) method for stereophonic acoustic echo cancellation (SAEC) and multichannel acoustic echo cancellation (MAEC). Effective coherence reduction, or decorrelation, of the transmission channels solves the non-uniqueness problem in SAEC applications as well as in MAEC applications. In particular, this disclosure describes a novel improved version of the principle discussed in Ref [6]. In the present approach, the concept of amplitude modulation (aka magnitude modulation) in the low-frequency range is introduced to effectively enhance the reduction in amplitude coherence and thereby improve the effectiveness of acoustic echo cancellation.

Figure 1:
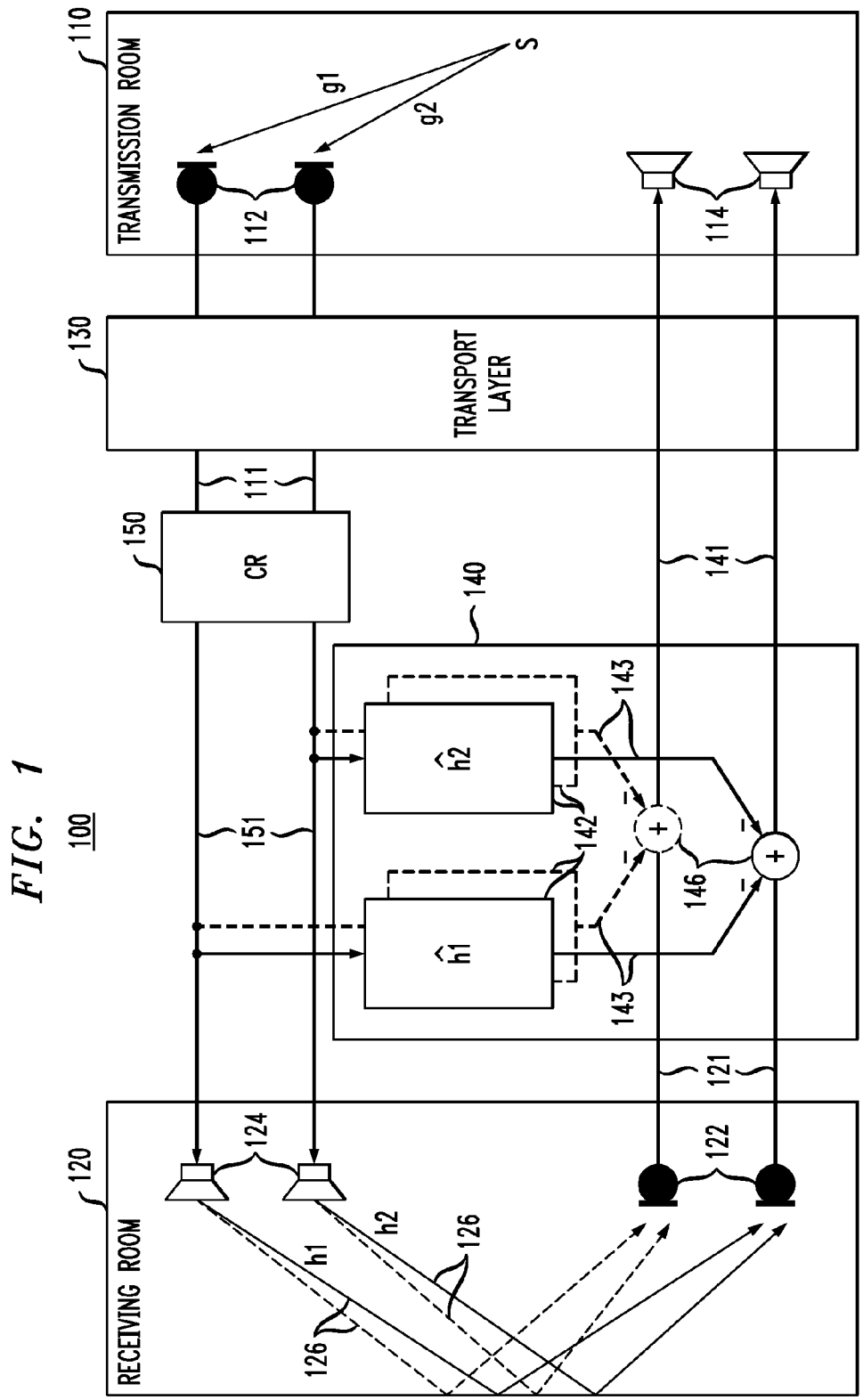
FIG. 1 shows a block diagram of an exemplary stereophonic audio system.

FIG. 1 shows a block diagram of an exemplary stereophonic audio system 100. As represented in FIG. 1, audio system 100 has (i) a transmission room 110 having left and right stereo microphones 112 and left and right stereo loudspeakers 114 and (ii) a receiving room 120 having left and right stereo microphones 122 and left and right stereo loudspeakers 124. Audio system 100 has a transport layer 130 that handles the transmission and reception of audio signals transmitted between the transmission room and the receiving room. Located near (or in) receiving room 120, audio system 100 also has an adaptive AEC module 140 and a coherence reduction (CR) module 150. Although not shown in FIG. 1, audio system 100 may also have an adaptive AEC module and a CR module analogous to modules 140 and 150 that are located near (or in) transmission room 110.

AEC module 140 comprises four adaptive echo models 142 corresponding to the four acoustic echo paths 126 from each different loudspeaker 124 in receiving room 120 to each different microphone 122 in receiving room 120. Each adaptive echo model 142 adaptively generates an estimate 143 of the audio signal corresponding to echo in the associated acoustic echo path 126 based on the corresponding incoming audio signal 151 received at receiving room 120 from transmission room 110. Those estimated echo audio signals 143 are subtracted at subtraction nodes 146 from the outgoing audio signals 121 transmitted from receiving room 120 to generate echo-cancelled audio signals 141 towards transmission room 110.

Acoustic echo paths 126 are normally modeled as FIR filters of lengths $L_r$ (for the receiving room, $h_i$, i=1, 2), L (echo path model, $\hat{h}_i$, i=1, 2), and $L_t$ (for the transmission room $g_i$, i=1, 2). The nominal realistic case usually has $L<L_r \approx L_t$. However, there are many use cases when this is not true. For example, if the stereo signal is synthesized, then the equivalent $L_t << L$ can exist. The length and the "strength" (reverberation) of the tail of the response influence convergence of the stereo AEC in more-complicated ways than what is normally experienced in monophonic AEC scenarios.

Coherence reduction module 150 processes the two outgoing audio signals 111 generated by microphones 112 in transmission room 110 to reduce the coherence between (i.e., decorrelate) those two signals. If the amount and type of decorrelation is appropriate, then the effectiveness of AEC module 140 in reducing echo can be significantly enhanced.

Figure 2:
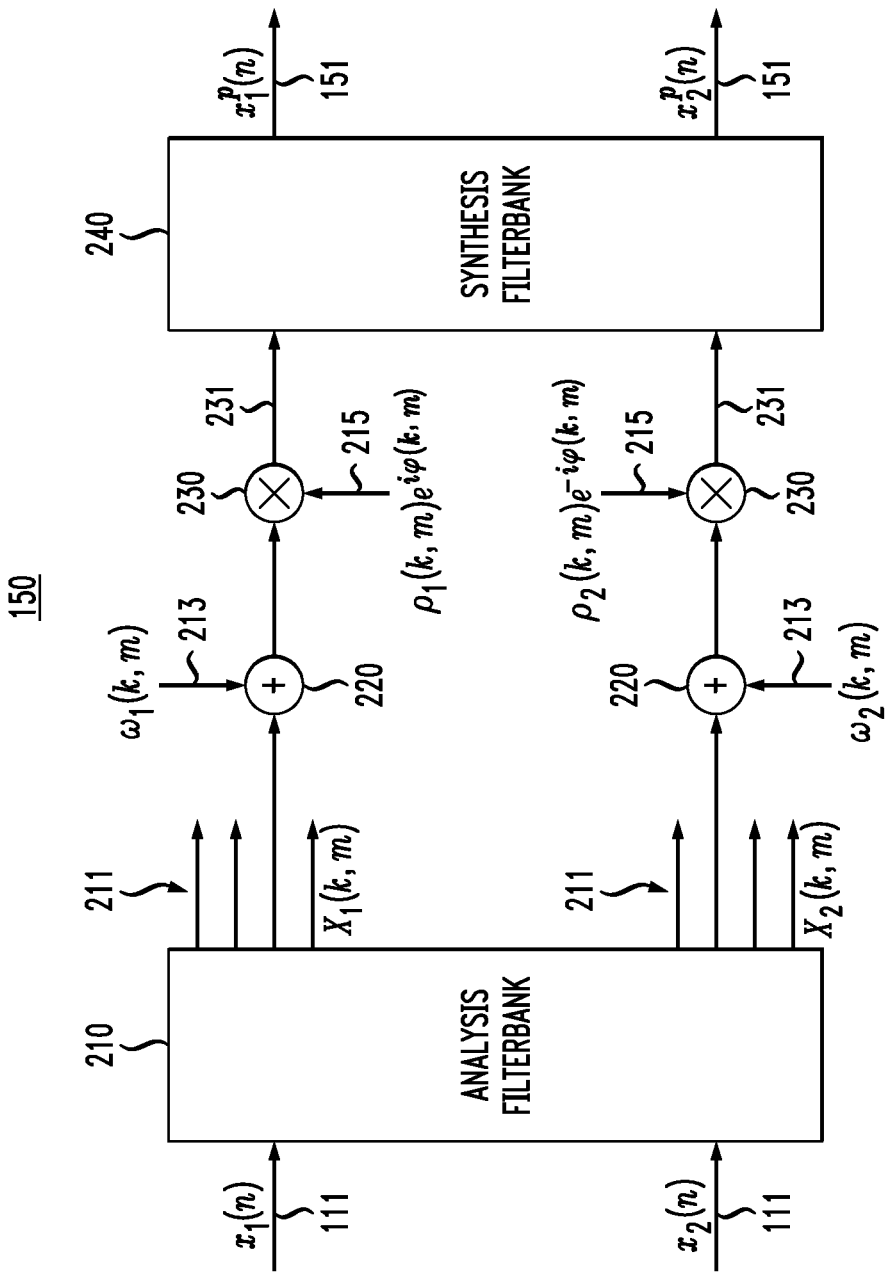
FIG. 2 shows a block diagram of the coherence reduction module of FIG. 1.

FIG. 2 shows a block diagram of coherence reduction module 150 of FIG. 1. CR module 150 has an analysis filterbank 210 that converts the time-domain outgoing audio signals 111 received from receiving room 120 into a plurality of frequency-domain audio signals 211. For each frequency band, CR module 150 has a pair of summation nodes 220 and a pair of multiplication nodes 230 that respectively and selectively add an uncorrelated noise signal 213 to the corresponding frequency-domain audio signal 211 and multiply the frequency-domain audio signal by a phase- and amplitude-modulation signal 215 to generate two decorrelated frequency-domain audio signals 231. CR module 150 also has a synthesis filterbank 240 that converts the two sets of decorrelated frequency-domain audio signals 231 into the two decorrelated time-domain incoming audio signals 151 that are rendered by the two loudspeakers 124 in receiving room 120.

Note that, in alternative implementations, the summation nodes 220 may be downstream of the multiplication nodes 230 or may even be omitted. Note further that, in some implementations, CR module 150 has only one set of summation nodes and only one set of multiplication nodes, such that uncorrelated noise, phase modulation, and amplitude modulation are applied to only one set of frequency-domain audio signals 211 in order to generate the two decorrelated time-domain audio signals 151. In that case, the other time-domain audio signal 111 does not even have to be converted into the frequency domain, although a time delay may need to be added to that audio path to keep the two stereophonic signals synchronized. Although a frequency-domain, sub-band implementation of CR module 150 has been described, time-domain implementations are also possible, including those that use parallel bandpass filters to process different signal sub-bands.

Coherence Reduction Architecture

FIG. 2 shows a preferred architecture for a stereo (two channels) coherence reduction (CR) module 150. As represented in FIG. 2, the decorrelated, frequency-domain audio signals $X_i^P(k,m)$, i=1, 2, (signal 231 in FIG. 2) are generated from the original, frequency-domain audio signals $X_i(k,m)$ (signal 211 in FIG. 2) according to the following:

$$X_1^P(k,m) = (X_1(k,m) + \omega_1(k,m))^* \rho_1(k,m) e^{i\phi(k,m)}$$

$$X_2^P(k,m) = (X_2(k,m) + \omega_2(k,m))^* \rho_2(k,m) e^{-i\phi(k,m)}$$

where $\omega_i(k,m)$ is the uncorrelated noise signal (signal 213 in FIG. 2), $\rho_i(k,m)$ is the amplitude modulation (part of signal 215 of FIG. 2), $\phi(k,m)$ is the phase function (part of signal 215 of FIG. 2), k is the frequency bin (i.e., sub-band) number, and m is the frequency-domain sample number. Note that, in the previous equations, complementary phase functions having the same magnitude, but different sign are applied. Alternative implementations may apply different phase functions. For example, an equivalent solution would be to apply the phase function $2^*\phi(k,m)$ to one signal and no phase function to the other signal.

A variant of this architecture was initially proposed in Ref [6], which architecture can also be seen as a frequency-domain generalization of the method described in Ref [5]. Moreover, the method proposed in Ref [7] can be re-interpreted to be a variant of the architecture of Ref [6] as well. The specific improvements of the architecture in FIG. 2 over the one in Ref [6] are the additions of amplitude modulation $[\rho_i(k,m)]$ (i.e., part of signal 215 of FIG. 2), signal-dependent adaptivity, and, if desired, the additive noise components $\omega_i(k,m)$ (i.e., signal 213 of FIG. 2). Although the methods described in Ref [5] and Ref [7] are very effective at reducing coherence for frequencies above 1 kHz or so without introducing significant audible distortions (spectral or image), they reduce coherence poorly for lower frequencies. The method in Ref [6] is still quite effective at reducing coherence below 1 kHz but image instability is just on the verge of being noticeable for loudspeaker playback. For headphone playback, image distortion is noticeable for the method in Ref [6]. The present proposal of introducing amplitude modulation and optional additive components alongside phase modulation enables decorrelation more effectively below 1 kHz and with less noticeable distortion than any previous method. This turns out to be very important since speech has most of its power in this frequency range.

Coherence reduction may be achieved by time variation and the addition of independent noise performed in a manner so as to be just noticeable to the human ear in the assumed playback scenario. That is, parameters can be set so that distortion may be perceived over headphones but not necessarily over loudspeaker playback. For an exemplary implementation at a 16000 Hz sample rate, an exemplary filterbank FFT (fast Fourier transform) size is K=128 with a frame size M=64. The significant decorrelating components are described in the following. The use of additive noise components is described in the Appendix.

Phase Modulation

Figure 3:
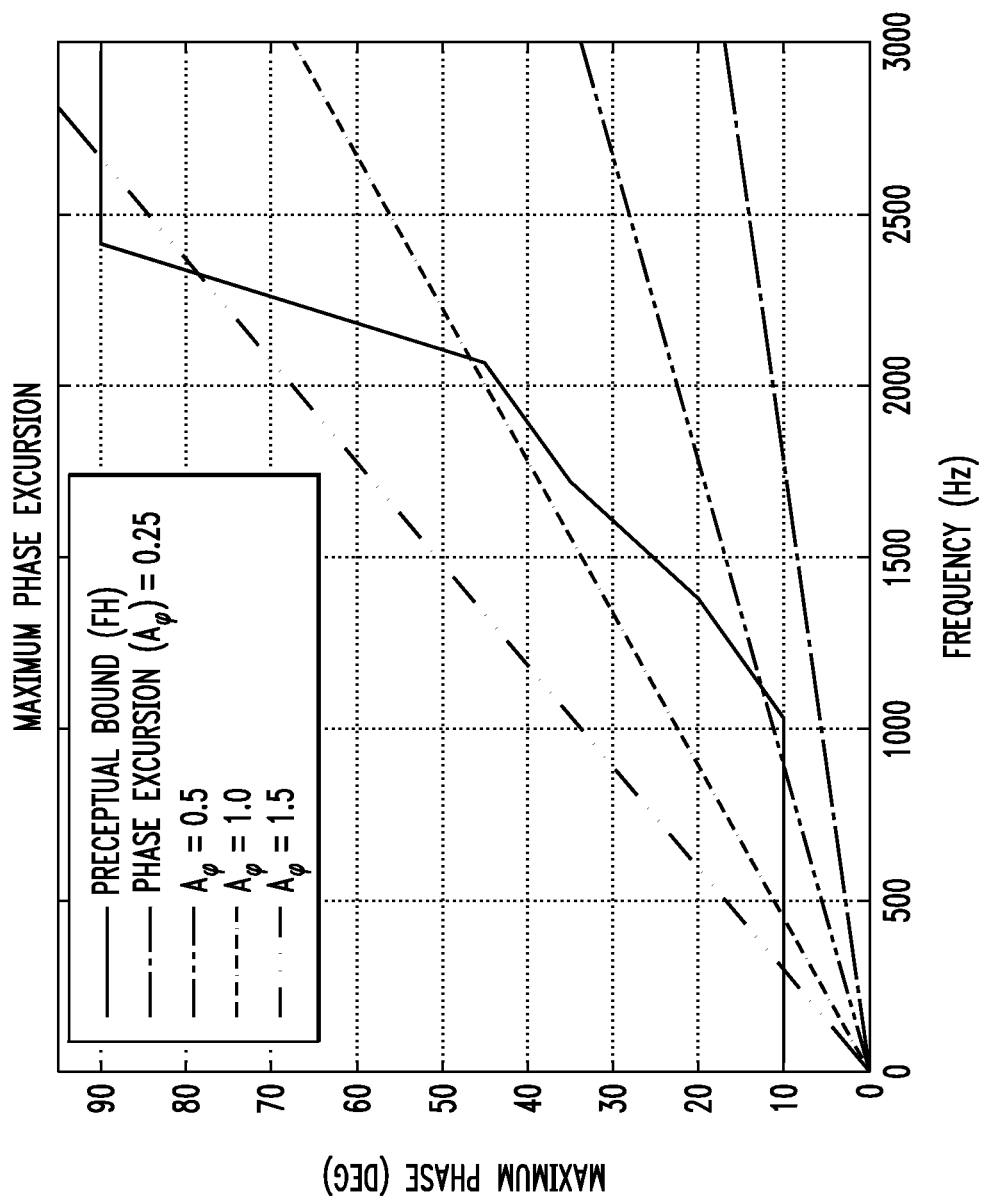
FIG. 3 graphically shows maximum phase excursion in degrees versus frequency introduced by a phase modulator.

For signal decorrelation using phase modification, time-periodic variation of the phase is particularly effective and, if so, one period of the present phase function φ(k,m) is described by:

$$\phi(k,m) = A_\phi(k)\sin(2\pi m/T_\phi); m=0, \ldots, T_\phi-1$$

$$T_\phi = \lfloor F_S/(M \cdot F_\phi) \rfloor,$$

where the maximum phase excursion, $A_\phi(k)$, is preferably dependent on frequency bin (i.e., sub-band) index k=0, ..., K/2, where K is the FFT size, m is the sample number in each frequency bin, $T_\phi$ is the phase-modulation period, $F_S$ is sample rate, the frame size M is the total number of samples in each frequency bin, and $F_\phi$ is the phase-modulation rate. If the phase excursion is chosen according to Ref. [6], i.e., below the solid curve shown in FIG. 3, the introduced phase distortion is not noticeable. One exemplary implementation employs the excursion of 0 with a phase-modulation rate $F_\phi$ of 2 Hz. These values are well within the perceptual bounds suggested in Ref. [6] but the present phase-modulation rate is slightly higher than what they recommend. The reason for this will be motivated in the next section.

Amplitude Modulation

To achieve a more-effective decorrelation for low frequencies, an amplitude-modulation function is added in coherence reduction module 150 of FIG. 1. The motivation for this approach is the fact that the human auditory system has somewhat lower sensitivity to amplitude variation at lower frequencies (<1.5 kHz), although it is very sensitive to amplitude variations at higher frequencies.

As with phase modulation, amplitude modulation can also be periodic and, if so, one period of the amplitude function $\rho_i(k)$, i=1, 2, is described by:

$$\rho_1(k) = 1 + A_\rho(k) \cdot \sin(2\pi m/T_\rho), m=0, \ldots, T_\rho-1,$$

$$\rho_2(k) = 1 - A_\rho(k) \cdot \sin(2\pi m/T_\rho); m=0, \ldots, T_\rho-1,$$

where the amplitude excursion, $A_{dB}(k)$, is defined as:

$$A_{dB}(k) = 20\log_{10}\left(\frac{1 + A_\rho(k)}{1 - A_\rho(k)}\right)$$

i.e., $$A_\rho(k) = \frac{10^{A_{dB}(k)/20} - 1}{10^{A_{dB}(k)/20} + 1}; k = 0, \ldots, K/2$$

and the amplitude-modulation period, $T_\rho$, is defined as:

$$T_\rho = \lfloor F_S/(M \cdot F_\rho) \rfloor,$$

where $F_\rho$ is the amplitude-modulation rate.

The maximum amplitude excursion, $A_{dB}(k)$, can depend on frequency bin index k=0, ..., K/2. It is important to tailor the amplitude excursion as a function of frequency to avoid perceptible distortion. Assuming a filterbank with a 125 Hz bin-width ($F_S$=16000, K=128, M=64), an exemplary set of parameter values for amplitude modulation are:

$A_{dB}(k)=0, k=0,$ $A_{dB}(k)=5, k=1, \ldots, 9,$ $A_{dB}(k)=4, k=10, 11, 12,$ $A_{dB}(k)=0, k \geq 13,$ $F_\rho=2.$ Hence, amplitude modulation is effectively applied in only the 125 Hz to 1500 Hz range. The amplitude-modulation rate is chosen to be 2 Hz. It is desirable to have a high modulation rate to ensure a stable stereo image. However, too high a rate causes audible spectral distortion. In Ref. [6], an amplitude-modulation rate of less than 1 Hz is preferred for minimizing audible distortion. A little higher rate can be chosen to make the image stability better. Also, it is advantageous to use the same rate for phase and amplitude modulation since image shift due to phase can be counteracted with the amplitude image shift (hence, these two image effects are "out of phase"). The resulting stabilization is small but still very useful.

Adaptive Modulation Control

To control dynamic artifacts at low frequencies, it is advantageous to make the amplitude modulation adaptive if certain conditions are met. The main problem of amplitude modulation is that, when the modulation rate is low, e.g., <8 Hz, the image of the background noise can still be perceived as "unstable". To mitigate this distortion, it is advantageous to reduce the level of amplitude modulation if the signals contain mainly background noise. Distinguishing this condition can, for example, be done by:

1. Detecting a low signal level compared to normal levels.
2. Detecting low inter-channel coherence in some frequency range.

The above can be combined as a single detection statistic for modulation level. For example, a combined statistic α can be formed as:

$$\overline{S}_{x_i} = \frac{1}{k_1 - k_0 + 1} \sum_{k=k_0}^{k_1} S_{x_i x_i}(k)$$

$$\overline{\gamma} = \frac{1}{k_1 - k_0 + 1} \sum_{k=k_0}^{k_1} \gamma(k)$$

$$\alpha = \min\{\overline{S}_{x_i}/\overline{S}_T, 1.0\} \cdot (\overline{\gamma} \geq \overline{\gamma}_T)$$

where $\overline{S}_{x_i}$ is the average frequency-bin signal level of signal $x_i$ over the frequency range from frequency bin $k_0$ to frequency bin $k_1$, $S_{x_i x_i}(k)$ is the energy of signal $x_i$ in frequency bin k, which is based on the cross-spectrum $S_{x_i x_j}(k)$ of frequency-domain signals $X_i(k) = \mathcal{F}\{x_i\}$; i=1, 2; k=0, ..., K/2 as:

$$S_{x_i x_j}(k) = E\{X_i(k) X^*_j(k)\}$$

where $E\{\cdot\}$ denotes ensemble expectation, $\mathcal{F}\{\cdot\}$ denotes Fourier transform, and * denotes complex conjugate, and γ is the complex coherence function between the two channels given by:

$$\gamma(k) = \frac{S_{x_1 x_2}(k)}{\sqrt{S_{x_1 x_1}(k) S_{x_2 x_2}(k)}}$$

$\overline{S}_T, \overline{\gamma}_T$ are appropriately chosen level and coherence thresholds, respectively. Examples of values for these are:

$\overline{S}_T = 10^{-50/10},$ $\overline{\gamma}_T = 0.70$

Then, the amplitude-modulation function $A_\rho(k)$ above is multiplied by α to implement the adaptive amplitude modulation aggressiveness.

Multichannel Audio Systems

For the multichannel case, the previously described equations for phase and amplitude modulations can be generalized as follows:

$$\phi_i(k,m) = A_\phi(k)\sin(2\pi m/T_\phi + \theta_{\phi,i}); m=0,\ldots,T_\phi-1$$

$$\rho_i(k) = 1 + A_\rho(k)\cdot\sin(2\pi m/T_\rho + \theta_{\rho,i}); m=0,\ldots,T_\rho-1,$$

where and $\theta_{\phi,i}$ and $\theta_{\rho,i}$, $i=0,\ldots,N-1$, are modulation-rate phase-shifts for the phase and the amplitude modulation functions, respectively. In the stereo case above, $\theta_{\phi,1}=0$, $\theta_{\phi,2}=\pi$, and $\theta_{\rho,1}=0$, $\theta_{\rho,2}=\pi$.

For a specific 5.1 surround channel case, the above could be used for the front left and right channels, leaving the center channel (subwoofer) unprocessed, and letting the rear surround channels (denoted channel 3 and 4) have phase shifts $\theta_{\phi,3}=\pi/2$, $\theta_{\phi,4}=3\pi/2$ and $\theta_{\rho,3}=\pi/2$, $\theta_{\rho,4}=3\pi/2$. This choice provides decorrelation of all channels and also the "out-of-phase" stabilization described above. However, other choices of phase-shifts will also work.

An alternative approach is to apply the "stereo-pair" phase-shifts as described above to the channel pair that has the highest correlation at a specific time. As the channel-correlation varies, the decorrelation will follow and focus on the most-important pair at a certain time.

Conclusions

In this disclosure, an effective decorrelation method has been described that provides a significant and predetermined coherence reduction, even at very low frequencies. The method has been shown by informal listening tests to preserve the original spatial image while not introducing perceivable spectral distortion. Exemplary unique features include:

- Combination of known phase modulation with a novel amplitude modulation in the low-frequency region.
- Balancing the image distortion by using the same modulation rate "out of phase" for phase and amplitude.
- Adaptively controlling the level of amplitude modulation to minimize distortion.

The proposed CR module solves the non-uniqueness/ill-conditioned problem inherent to stereo and multichannel echo cancellation since it guarantees that the transmission signals are not highly correlated. The maximum coherence at low frequencies is in the neighborhood of 0.90 and thus stabilizes the solution significantly. The coherence reduction for speech is substantially the same as in the stationary noise case, and significant coherence reduction is achieved below 1 kHz where it is most important for the SAEC application.

Appendix: Additive Components

Another option to control coherence is the addition of incoherent (i.e., uncorrelated) noise. This idea was proposed in the very beginning stereophonic echo cancellation work. Although this technique on its own does not provide satisfactory coherence reduction, it can be applied to achieve some extra performance over what is already achieved by using, e.g., the phase- and amplitude-modulation methods described above. In a filterbank architecture, it is straightforward to add noise at a level which, in theory, is below the level of perception. That is, let:

$$\omega_\Sigma \in \mathcal{N}(0,1),$$

be independent, identically distributed Gaussian samples of unit variance, and define $X_i(k,m)$ to be a complex filterbank sample at frequency index k and block index m such that:

$$X_p'(k,m) = X_p(k,m) + \delta(RE\{X_p(k,m)\}\omega_r + j\cdot IM\{X_p(k,m)\}\omega_i)$$

$$\delta = 10^{-\delta_{dB}/20}.$$

It has been described in literature, under certain conditions, that, if $\delta_{dB}$ is larger than 13.6 dB, then the noise is not noticeable (Ref [11]). Hence, the threshold can be conservatively set to something larger than 13.6 dB. Consequently, where, in frequency, the filterbank bandwidth is close to that of the critical bands, this added noise should not be perceivable.

REFERENCES

Incorporated Herein by Reference in their Entirety

[1] J. Benesty et al., "Advances in Network and Acoustic Echo Cancellation," Springer, 2001.

[2] M. M. Sondhi, D. R. Morgan, and J. L. Hall, "Stereophonic Acoustic. Echo Cancellation—An Overview of the Fundamental Problem," IEEE Signal Processing Letters, Vol. 2, No. 8, August 1995.

[3] J. Benesty, D. R. Morgan, and M. M. Sondhi, "A Better Understanding and an Improved Solution to the Specific Problems of Stereophonic Acoustic Echo Cancellation," IEEE Trans. Speech and Audio Proc., Vol. 6, pp. 156-165, March 1998.

[4] M. Ali, "Stereophonic Echo Cancellation System using Time-varying all-pass Filtering for Signal Decorrelation," in Proc. IEEE ICASSP, 1998, pp. 3689-3692.

[5] Y. Joncour and A. Sugiyama, "A Stereo Echo Canceller with Pre-processing for Correct Echo-path Identification," in Proc. IEEE ICASSP, 1998.

[6] J. Herre, H. Buchner, and W. Kellermann, "Acoustic echo cancellation for surround sound using perceptually motivated convergence enhancement," in Proc. IEEE ICASSP, 2007.

[7] T. S. Wada, and B. H. Juang, "Multi-Channel Acoustic Echo Cancellation based on Enhancement with Effective Decorrelation via Resampling," in Proc. IWAENC, 2010.

[8] N. I. Durlach and H. S. Colburn, "Binaural Phenomena," Handbook of Perception, Vol. 4 (Hearing), edited by E. C. Carterette and M. P. Friedman, Academic, NY, 1978, pp. 365-466.

[9] M. M. Sondhi and D. R. Morgan, "Acoustic Stereophonic Teleconferencing," in Proc. WASPAA, 1991.

[10] T. Gaensler and J. Benesty, "New Insights Into the Stereophonic Acoustic Echo Cancellation Problem and an Adaptive Nonlinearity Solution," IEEE Trans. Speech and Audio Proc., Vol. 10, No. 5, July 2002.

[11] K. Brandenburg and J. D. Johnston, "Second generation perceptual audio coding: The hybrid coder," *AES 88th Conv. Preprint*, March 1990.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for reducing echo in audio signals, the method comprising:
   (a) receiving a first plurality of audio signals from a first side of an audio communication;
   (b) applying phase modulation and amplitude modulation to at least one of the audio signals to generate a plurality of decorrelated audio signals, wherein the plurality of decorrelated audio signals are rendered at a second side of the audio communication;

(c) receiving a second plurality of audio signals from the second side, wherein the second plurality of audio signals were generated based on the plurality of decorrelated audio signals; and (d) applying acoustic echo cancellation to the second plurality of audio signals to reduce the echo in the second plurality of audio signals.

2. The method of claim 1, wherein the second plurality of audio signals were generated by rendering the plurality of decorrelated audio signals using a plurality of loudspeakers at the second side as acoustic signals that traverse acoustic echo paths to a plurality of microphones at the second side that generate the second plurality of audio signals.

3. The method of claim 1, wherein:
the first plurality of audio signals are a first pair of stereo audio signals;
the plurality of decorrelated audio signals are a pair of decorrelated stereo audio signals; and
the second plurality of audio signals are a second pair of stereo audio signals.

4. The method of claim 3, wherein step (b) comprises applying phase modulation and amplitude modulation to each of the first pair of stereo audio signals to generate the pair of decorrelated stereo audio signals.

5. The method of claim 1, wherein step (b) comprises:
(b1) converting the at least one audio signal from a time domain into a frequency domain;
(b2) applying different phase modulation and amplitude modulation to different frequency-domain audio signals to generate modulated frequency-domain audio signals; and
(b3) converting the modulated frequency-domain audio signals from the frequency domain into the time domain to generate the plurality of decorrelated audio signals.

6. The method of claim 5, wherein greater amplitude modulation is applied to selected low-frequency audio signals than to selected high-frequency audio signals.

7. The method of claim 6, wherein no amplitude modulation is applied to frequency-domain audio signals above a specified high-frequency threshold.

8. The method of claim 7, wherein no amplitude modulation is applied to frequency-domain audio signals below a specified low-frequency threshold.

9. The method of claim 5, wherein greater amplitude modulation is applied to frequency-domain audio signals corresponding to human speech than to other frequency-domain audio signals.

10. The method of claim 1, wherein:
the phase modulation has a phase-modulation rate; and
the amplitude modulation has an amplitude-modulation rate, wherein the phase-modulation and amplitude-modulation rates are selected such that image shift due to the phase modulation is out of phase with image shift due to the amplitude modulation.

11. The method of claim 10, wherein the amplitude-modulation rate is substantially equal to the phase-modulation rate.

12. The method of claim 1, wherein step (b) further comprises adaptively generating the amplitude modulation.

13. The method of claim 12, wherein step (b) comprises:
(b1) determining whether the first plurality of audio signals comprise substantially background noise; and
(b2) reducing the amplitude modulation if step (b1) determines that the first plurality of audio signals comprise substantially background noise.

14. The method of claim 13, wherein step (b1) determines that the first plurality of audio signals comprise substantially background noise when (i) the first plurality of audio signals have a low signal level and (ii) the first plurality of audio signals have a low inter-channel coherence level within a specified frequency range.

15. The method of claim 12, wherein step (b) comprises:
(b1) generating a background-noise coefficient for the first plurality of audio signals; and
(b2) generating the amplitude modulation based on the background-noise coefficient.

16. The method of claim 15, wherein step (b1) comprises generating the background-noise coefficient based on signal level and coherence level of the first plurality of audio signals.

17. The method of claim 1, wherein:
the second plurality of audio signals were generated by rendering the plurality of decorrelated audio signals using a plurality of loudspeakers at the second side as acoustic signals that traverse acoustic echo paths to a plurality of microphones at the second side that generate the second plurality of audio signals;
step (b) comprises:
(b1) converting the at least one audio signal from a time domain into a frequency domain;
(b2) applying different phase modulation and amplitude modulation to different frequency-domain audio signals to generate modulated frequency-domain audio signals; and
(b3) converting the modulated frequency-domain audio signals from the frequency domain into the time domain to generate the plurality of decorrelated audio signals;
greater amplitude modulation is applied to frequency-domain audio signals corresponding to human speech than to other frequency-domain audio signals;
no amplitude modulation is applied to frequency-domain audio signals above a specified high-frequency threshold;
no amplitude modulation is applied to frequency-domain audio signals below a specified low-frequency threshold;
the phase modulation has a phase-modulation rate;
the amplitude modulation has an amplitude-modulation rate, wherein the phase-modulation and amplitude-modulation rates are selected such that image shift due to the phase modulation is out of phase with image shift due to the amplitude modulation;
the amplitude-modulation rate is substantially equal to the phase-modulation rate; and
step (b) further comprises adaptively generating the amplitude modulation by:
(b4) generating a background-noise coefficient for the first plurality of audio signals based on signal level and coherence level of the first plurality of audio signals; and
(b5) generating the amplitude modulation based on the background-noise coefficient.

18. The method of claim 17, wherein:
the first plurality of audio signals are a first pair of stereo audio signals;
the plurality of decorrelated audio signals are a pair of decorrelated stereo audio signals;
the second plurality of audio signals are a second pair of stereo audio signals; and step (b) comprises applying phase modulation and amplitude modulation to each of the first pair of stereo audio signals to generate the pair of decorrelated stereo audio signals.

19. An audio signal processing system for reducing echo in audio signals, the system comprising:
- a coherence reduction (CR) module configured to (i) receive a first plurality of audio signals from a first side of an audio communication and (ii) apply phase modulation and amplitude modulation to at least one of the audio signals to generate a plurality of decorrelated audio signals, wherein the plurality of decorrelated audio signals are rendered at a second side of the audio communication; and
- an acoustic echo cancellation (AEC) module configured to (i) receive a second plurality of audio signals from the second side, wherein the second plurality of audio signals were generated based on the plurality of decorrelated audio signals, and (ii) apply acoustic echo cancellation to the second plurality of audio signals to reduce the echo in the second plurality of audio signals.

* * * * *